(12) United States Patent
Tennant et al.

(10) Patent No.: US 9,063,782 B2
(45) Date of Patent: Jun. 23, 2015

(54) CHANGING RESOURCE ALLOCATION AMONG A PLURALITY OF CONCURRENTLY EXECUTING APPLICATIONS IN A PORTABLE MULTIMODE COMMUNICATION DEVICE IN RESPONSE TO A CHANGE IN USAGE SCENARIO

(71) Applicant: HARRIS CORPORATION, Melbourne, FL (US)

(72) Inventors: Bryce Tennant, Rochester, NY (US); Kenton Weigold, Henrietta, NY (US); Tibor Dobri, Holley, NY (US)

(73) Assignee: Harris Corporation, Melbourne, FL (US)

( * ) Notice: Subject to any disclaimer, the term of this patent is extended or adjusted under 35 U.S.C. 154(b) by 211 days.

(21) Appl. No.: 13/856,552

(22) Filed: Apr. 4, 2013

(65) Prior Publication Data

US 2014/0304711 A1    Oct. 9, 2014

(51) Int. Cl.
     *G06F 9/46*      (2006.01)
     *G06F 9/50*      (2006.01)

(52) U.S. Cl.
     CPC ....................... *G06F 9/50* (2013.01)

(58) Field of Classification Search
None
See application file for complete search history.

(56) References Cited

U.S. PATENT DOCUMENTS

| 5,535,432 | A | * | 7/1996 | Dent | 455/77 |
|---|---|---|---|---|---|
| 2003/0144002 | A1 | * | 7/2003 | Chambers et al. | 455/450 |
| 2006/0234758 | A1 | * | 10/2006 | Parupudi et al. | 455/550.1 |
| 2010/0048256 | A1 | * | 2/2010 | Huppi et al. | 455/574 |
| 2011/0145591 | A1 | * | 6/2011 | Grzybowski | 713/189 |
| 2012/0077536 | A1 | * | 3/2012 | Goel et al. | 455/518 |
| 2012/0173897 | A1 | * | 7/2012 | Karkaria et al. | 713/300 |

* cited by examiner

*Primary Examiner* — Abdullah Al Kawsar
*Assistant Examiner* — Jorge A Chu Joy
(74) *Attorney, Agent, or Firm* — Robert J. Sacco, Esq.; Fox Rothschild LLP

(57) ABSTRACT

A software environment (300) is established in a portable multimode communication device (PMCD) (100) in which a plurality of software applications (310, 312, 314, 316) are executing. Each software application performs a predetermined function using a hardware set. The hardware set includes a plurality of hardware resources (204, 206, 209, 210, 218, 220, 222, 104, 226, 236, 228, 232, 230, 234) provided on the PMCD. The PMCD will periodically evaluate a usage scenario and, based on this evaluation, allocates to each software application selected ones of the plurality of hardware resources comprising the hardware set. The allocation of hardware resources comprising each hardware set is dynamically varied in response to the evaluating.

14 Claims, 5 Drawing Sheets

CHANGING RESOURCE ALLOCATION AMONG A PLURALITY OF CONCURRENTLY EXECUTING APPLICATIONS IN A PORTABLE MULTIMODE COMMUNICATION DEVICE IN RESPONSE TO A CHANGE IN USAGE SCENARIO

BACKGROUND OF THE INVENTION

1. Statement of the Technical Field

The inventive arrangements relate to multimode devices and more particularly to methods and systems for providing controlled access to hardware resources needed for mission critical applications.

2. Description of the Related Art

Public safety personnel commonly make use of multiple devices for communication and data processing. For example, a public safety officer may be equipped with one or more of a land mobile radio (LMR), a cell phone, laptop, a tablet computer and so on. Advances in technology have made possible the creation of multimode devices that integrate the functionality of two or more such systems into a single device. In these types of devices, software applications frequently implement important functionality using limited hardware resources (e.g., buttons, knobs, speakers, displays, and processing resources) which must be shared with other applications. While these arrangements can work well in many scenarios, they will often contradict the mission critical expectations associated with public safety equipment. More particularly, a mission critical function may not be available when needed due to requested hardware resources being in use by another, possibly lower priority, function. Whether or not a particular function is deemed mission critical can vary in accordance with different operational scenarios and with different types of users.

SUMMARY OF THE INVENTION

Embodiments of the invention concern a method for providing to a plurality of software applications executing in a software environment controlled access to limited hardware resources on a portable multimode communication device (PMCD). The method begins by establishing a software environment in the PMCD in which a plurality of software applications are executing. Each software application is configured to perform at least one predetermined application function using a respective hardware set. Each hardware set is comprised of a plurality of hardware resources provided on the PMCD. The method involves evaluating a usage scenario of the PMCD based on one or more parameters. Based on such evaluation, selected ones of the hardware resources comprising each set are dynamically allocated to each of the software applications.

According to another aspect, the invention concerns a portable multimode communication device (PMCD). The PMCD includes a processing device configured to receive data comprising a plurality of parameters and determine a usage scenario for the PMCD based on the parameters. The processing device evaluates the usage scenario to determine a hardware resource allocation for each of a plurality of software applications executing in a software environment on the PMCD. The processing device dynamically re-allocates selected hardware resources in the PMCD based on a change in at least one of the parameters. The re-allocation can provide a first one of the plurality of software applications with access to a hardware resource which is at the same time required by a second one of the priority of software applications. The re-allocation in such a scenario is based on a determination that the first software application performs a function which is determined to be mission critical based on the usage scenario. Access to hardware resources as described herein can be exclusive or shared, depending on the particular hardware resource and the needs of the particular software application.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
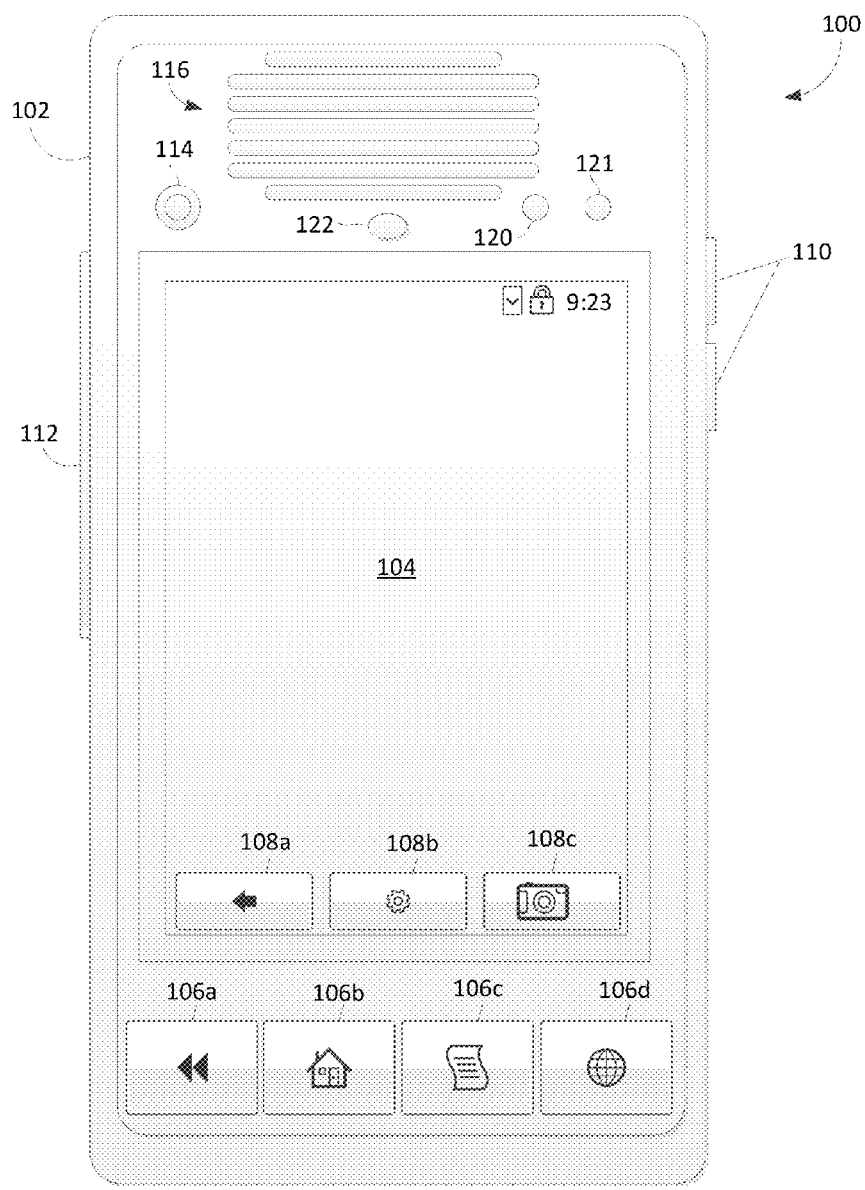
FIG. 1 is a drawing that is useful for understanding certain features associated with a portable multimode communication devices.

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

In a portable multimode communication device (PMCD) the functionality of two or more communication systems and/or data processing systems are integrated into a single device. For example, a PMCD can function as a land mobile radio (LMR) but can also include functions beyond LMR communications. These additional functions are provided by integrated systems for implementing broadband data communications, cellular voice communications, voice and/or image recording, GPS functionality, navigation, and so on. In such a device, a mobile software operating system provides a software environment in which a plurality of different software applications are instantiated to implement desired functions. The present invention concerns a method and system for hardware access control in a scenario where limited hardware resources are available to the applications which are running on the device. More particularly, the invention concerns dynamic methods and systems for allocating hardware resources to the various software applications to ensure that mission critical functions offered by the device are always available when needed on a quality of service (QoS) basis.

In order to accomplish the foregoing desired result, there is identified a hardware set for each software application performing a predetermined function. The hardware set is a defined set of hardware resources provided on said PMCD that the particular software application needs in order to have full functionality. A determination is also made as to the current actual hardware requirements of a particular application, as such requirements may change depending upon the particular state of the application. Thereafter, a critical resource manager evaluates a usage scenario of the PMCD based on one or more parameters, and based on this evaluation allocates to each software application selected ones of the hardware resources which comprise the hardware set. Ideally, each application which is executing will receive a complete hardware set including all of the hardware resources which normally comprise the set. However, the hardware resources are naturally limited on the device. Accordingly, an evaluation of the usage scenario and current hardware resource requirements may dictate that not all hardware components within a particular hardware set should be allocated to a particular application. Conversely, the same evaluation may indicate that the available resources in use by one application are instead allocated to other software applications. The invention involves dynamically varying the selected ones of the hardware resources within each set that are allocated to each software application based on the evaluating step.

In some embodiments of the invention, the software environment described herein is an operating system for a mobile cellular telephone device, and the evaluating, allocating, and varying of hardware resources as described herein is performed by a critical resource manager. The critical resource manager will reside at a level within the operating system stack that is advantageous for selectively allocating available hardware resources based on a variety of inputs. To this end, the critical resource manager will include a QoS engine or calculator to dynamically assign hardware components to ensure a predetermined quality of service with regard to mission critical requirements. The usage scenario is reevaluated periodically or when a change occurs in at least one of the parameters. Consequently, individual hardware resources or components allocated among the software applications are dynamically reallocated based on the detected usage scenario (as indicated by the parameters).

The parameters described herein are used to shape the dynamic hardware allocation in accordance with a wide variety of usage scenarios. As such, parameters can include parameters determined in accordance with a user configuration, availability of one or more networks, location information, motion information and ambient conditions external to the PMCD. Ambient conditions can include a wide variety of conditions including but not limited to a visual scene within which the PMCD is present, a presence of a particular identified human face (based on a captured facial image), a lighting condition (ambient light level), an audio condition, an RF communication condition, a network condition, an orientation condition, a location condition, and a motion condition. The parameters can also include network control messages (e.g. an IP based message received from a dispatch center). The parameters and their effects upon hardware allocation will be understood more fully from the description below.

Referring now to FIG. 1, there is shown a portable multi-mode communication device (PMCD) 100 comprised of a chassis 102. The PMCD 100 is typically a small device, sized to be easily carried by a user, and can be powered by replaceable or rechargeable batteries. To facilitate the various operating modes described herein, PMCD 100 will include one or more user interface features to facilitate control of the device. At least some of these user interface features will include hardware devices. For example, PMCD 100 can include an interactive user display 104. The user display can be a touch screen display to facilitate implementation of one or more soft keys 108a, 108b, 108c for controlling various functions. The user display 104, also provides status information to the user. The user display 104 is also capable of displaying text data that is received by the PMCD 100 from another communication device. A user display 104 as described herein can be implemented as an LCD display, LEDs, and/or other indication devices.

The PMCD 100 can also include one or more hardware keys, such as keys 106a, 106b, 106c, 106d as shown. A push-to-talk button 112 is provided for transmit operations that are implemented using a PTT mode. The PMCD further include volume controls 110 for varying an audio output volume for the device, transmit/receive indicator lamps 120, 121, microphone 114 and a speaker aperture 116 formed in chassis 102 which is acoustically coupled to a speaker cavity (not shown). Those skilled in the art will appreciate that a PMCD 100 can include a wide variety of hardware resources beyond those listed here, which are merely intended as exemplary. For example, the PMCD 100 can have additional buttons, such as a camera shutter control button, audio input hardware and so on.

The PMCD 100 is advantageously configured to facilitate two or more operating modes, and at least some of these modes may operate concurrently. In one operating mode, the PMCD 100 operates as a land mobile radio (LMR) that communicates with other LMR devices using an RF interface. In one embodiment the PMCD 100 is configured to communicate in an analog or digital mode with Project 25 (P25) radios. The phrase "Project 25 (P25)", as used herein, refers to a set of system standards produced by the Association of Public Safety Communications Officials International (APCO), the National Association of State Telecommunications Directors (NASTD), selected Federal Agencies and the National Communications System (NCS). The P25 set of system standards generally defines digital radio communication system architectures capable of serving the needs of Public Safety and Government organizations. The PMCD 100 can also be configured to communicate in analog mode with non-P25 radios using an RF interfaces.

The PMCD 100 can be used in a "talk around" mode. "Talk around" mode allows communications between two LMR devices without any intervening equipment, e.g., a repeater, between the two devices. The PMCD 100 can also be used in a conventional repeater mode where two or more LMR devices communicate through a repeater (not shown) without trunking. The PMCD 100 can further be used in a trunked mode where traffic is automatically assigned to one or more voice channels by the repeater. The PMCD 100 can be configured to operate in a single frequency band, or alternatively may operate in a plurality of frequency bands. For example, an RF interface provided in the PMCD 100 can be configured to support analog Frequency Modulation (FM) communications and P25 modulation (digital C4FM) communications in the following bands: 30-50 MHz Very High Frequency (VHF) LOw (LO) band; 136-174 MHz VHF High (Hi) band; 380-520 MHz Ultra High Frequency (UHF) band; and 762-870 MHz band. The PMCD 100 can also be configured to operate in other frequency bands and with other modulation schemes.

The PMCD 100 is also configured to facilitate other types of communication modes, including operation as a mobile telephony device. As such, the PMCD 100 can communicate with other telephony devices using cellular base stations (not shown) which are provided as part of a cellular network. Mobile telephony operations are well know and therefore will not be described here in detail. However, it can be understood that PMCD 10 can operate using any one of a plurality of well known cellular communications standards which are now known or may be known in the future. For example, the PMCD 100 can be configured to communicate using various digital cellular technologies including Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN).

The PMCD can further include suitable facilities for communicating with the use of one or more wireless networks. These wireless networks can include wireless personal area networks (WPANs), wireless local area networks (WLAN), wireless mesh networks, and wireless wide area networks (WANs). In an exemplary embodiment, the wireless network can be designed to accommodate broadband data communication capability. For example, a network of this kind would advantageously make use a wireless broadband technology such as LTE (Long Term Evolution) or 4G (fourth generation). As is known in the art, LTE wireless broadband technology can provide mobile cellular devices with broadband access to the internet and to other services which demand broadband capability. Alternatively, or in addition to the foregoing, the PMCD can conform to a wireless network standard such as the IEEE 802.16 family of wireless networks, which are sometimes referred to as WiMAX.

The PMCD can also include other wireless network communication capabilities. Exemplary short range wireless communications can be configured to use the Bluetooth® protocol, or other short range wireless technology such as the 802.xx family of wireless communications standards, including Wi-Fi, the near field communication (NFC) standard, and ZigBee®. The details of these technologies and the hardware required to implement transmitters and receivers that use these technologies are well known to persons skilled in the art, and thus, will not be described in detail herein.

Figure 2:
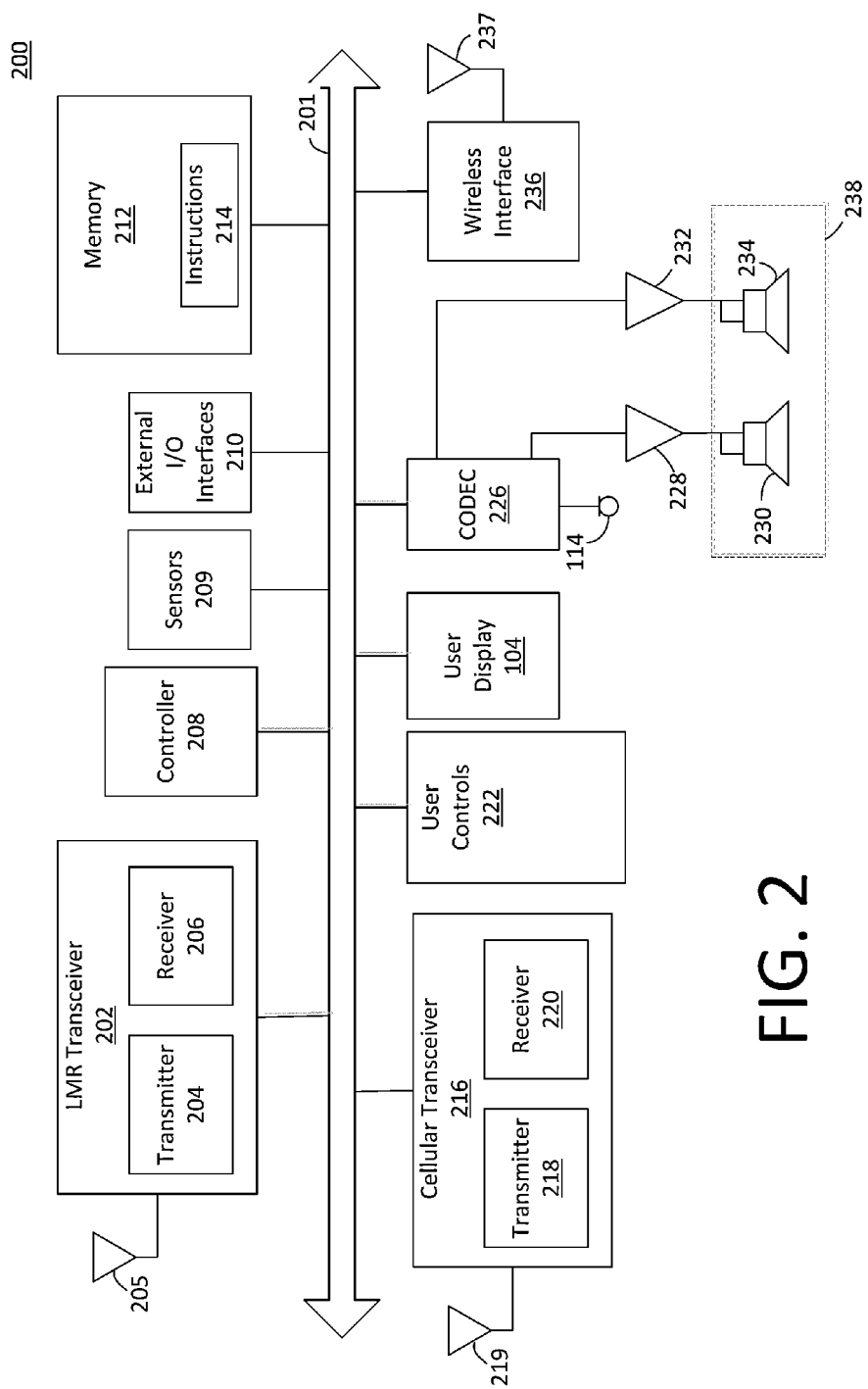
FIG. 2 is a block diagram showing certain exemplary hardware resources included in the device shown in FIG. 1.

Referring now to FIG. 2, there is provided a more detailed hardware block diagram 200 of PMCD 100 in accordance with an embodiment of the present invention. The PMCD 100 includes a controller 208. The controller 208 is comprised of at least one electronic processing device. For example, the controller 208 can include one or more microprocessors, microcontrollers, application-specific integrated circuits (ASICs) and programmable devices, such as a field programmable gate arrays (FPGAs) or complex programmable logic devices (CPLDs). The controller 208 may also have access to memory 212. The memory 212 may include volatile memory, such as static or dynamic RAM, and non-volatile memory, such as ferroelectric memory, magneto-resistive memory, flash memory, or a hard disk drive. The memory 212 can be used to store program instructions (e.g., software code) and other information required by the controller 208.

The controller 208 can communicate with memory 212 and one or more other component modules by means of at least one data communication bus 201. For example, the controller 208 can use bus 201 to communicate with one or more external I/O interfaces 210. Examples of external I/O interfaces include ports for USB, serial, Ethernet, and IEEE 1394 (Firewire) type, among others. Such interfaces are well known to persons skilled in the art, and thus, will not be described in great detail herein. A user can interact with the controller 208 through the External I/O interfaces 210 to upgrade software code and to transfer information to and from the controller 208. The controller 208 also receives information from one or more sensors 209. The sensors can include motion sensors, vibration sensors, location sensors (e.g., GPS location sensing devices), temperature sensors and so on. The sensors can also include optical sensors including imaging devices for sensing a visual scene, and light sensors capable of detecting ambient light levels. If an imaging device is provided, then such imaging device can optionally be used to facilitate a facial recognition capability, which for purposes of this invention would be deemed another sensor input. The sensor suite for a particular PMCD 100 is advantageously selected to enhance a usage scenario with a robust range of information suitable for evaluating a usage scenario. However, more or fewer sensor can be chosen for a particular PMCD 100 without limitation.

The memory 212 includes a computer-readable storage medium on which is stored one or more sets of instructions 214 (e.g., software code) configured to implement one or more of the methodologies, procedures, or functions described herein. The instructions 214 can also reside, completely or at least partially, within the controller 208. The controller 208 executes the program instructions to perform the functions assigned to the controller 208. Alternatively, the methods, procedures or functions described herein can be implemented using dedicated hardware implementations. Thus, the exemplary system is applicable to software, firmware, and hardware implementations.

The PMCD 100 includes certain user controls which are represented collectively in FIG. 2 as user controls 222. The user controls include a plurality of buttons, switches and knobs that a user can use to interact with the controller 208. Accordingly, the user controls 222 can include PTT button 112 and volume controls 110. The user controls 222 can also include one or more soft keys (e.g. soft keys 108a-108c) and/or hardware-based keys 106a-106d. These keys can be used to support any operations of the PMCD, such as selection of RF channel and/or frequency band on which communications are to be conducted. Additional soft keys can be presented on the display for purposes of implementing a DTMF keypad, and/or other user definable keys. The user controls 222 can also include a touch-screen keyboard, which can be used to enter text data to be stored or transmitted.

The PMCD includes an LMR transceiver 202 comprised of a transmitter 204, receiver 206 and an antenna 205. There are many different possible methods of implementing the LMR transceiver 202.

An exemplary transmitter 204 includes a modulator and a local oscillator (not illustrated). The function of the transmitter 204 is to modulate data onto an RF signal derived from the local oscillator and amplify the modulated signal for transmission. The data to be modulated is provided by the controller 208 to the transmitter 204. The RF signal produced by the transmitter 204, which carries the data, is amplified using an RF power amplifier (not shown) and is coupled to the antenna 205. The RF signal is thereby broadcast to a repeater or to another LMR based communication device.

An exemplary receiver 206 includes a demodulator and a second local oscillator (not illustrated). An RF signal is received from the antenna 205 and amplified by a low noise power amplifier (not shown). The amplified received RF signal is then demodulated by the receiver 206 using the second local oscillator. Data is thereby extracted from the input RF signal. The extracted data is provided to the controller 208.

The controller 208 sets the frequency of the local oscillators and the gain of the power amplifiers. The frequency of the local oscillators is typically defined by the channel that the PMCD 100 is set to. If the PMCD 100 transmits and receives data using the same frequency, the RF interface may include only a single local oscillator (not illustrated) that is shared by the transmitter 204 and the receiver 206.

The cellular transceiver 216 includes a transmitter 218, a receiver 220 and an antenna 219. The controller 208 uses communication bus 201 to communicate data and control signals to and from the cellular transceiver 216. The cellular transceiver 216 functions in a manner similar to the LMR transceiver 202. However, the air interface and other communications processes implemented in cellular transceiver 216 will be based on a digital cellular communications protocol. The digital cellular communication protocol can be any of a variety of well known cellular communication protocols as outlined above. The cellular communication processes are implemented and controlled by controller 208 using instructions 214.

The wireless interface 236 provides a wireless communications interface for implementing a wireless communication link. As an example, the wireless interface can include hardware for implementing one or more of LTE, LAN or PAN type network communications using a wireless link. In a further exemplary embodiment, the wireless interface 236 provides an interface that uses a WiFi® or Bluetooth® protocol as known in the art. An antenna 237 is provided to facilitate the wireless communications described herein using wireless interface 236. Data and control signals are passed between the controller 208 and the wireless interface 236 using communication bus 201. Instructions 214 can facilitate voice or data communications using wireless interface 236. For example, wireless interface 236 can be used to facilitate a voice over IP (VoIP) communication session as is known in the art.

A PMCD 100 as described herein can include one or more speakers for converting electrical signals into sound. For example, the PMCD 100 can include a handset speaker 230 and a loudspeaker 234 within the chassis 102. Driver circuitry 228 is used to provide audio drive signals for handset speaker 230 and driver circuitry 232 is used to provide audio drive signals for loudspeaker 234. The volume level of handset speaker 230 and loudspeaker 234 can be respectively adjusted using volume controls 110. A CODEC 226 functions to convert encoded audio data from controller 208 to analog audio signals which are suitable for use as input signals for driver circuits 228, 232. The controller 208 can receive such encoded audio data from any one of the LMR transceiver 202, cellular transceiver 216 or wireless interface 236 according to a particular communication session. In some embodiments, one or both of audio driver circuits 228, 232 can be integrated into a single device comprising the CODEC 226.

Analog audio signals from microphone 114 are provided to audio CODEC 226 where the analog audio signals are encoded in a digital format. Audio CODEC devices are well known in the art and therefore will not be described here in detail. However, it will be appreciated that CODEC 226 can encode the analog audio signals using any encoding protocol that is suitable for a particular type of communication session. For example, the CODEC can encode received analog audio from microphone 114 using the Advanced Multiband Excitation (AMBE) vocoder system as defined by P25 standards. Alternatively, other voice coding methods can be used for this purpose as may be appropriate for other types of communication sessions. The encoded audio signals are provided from CODEC 226 to controller 208 where they can be formatted and arranged for transmission using LMR transceiver 202, cellular transceiver 216, or wireless interface 236

From the foregoing it will be understood that the PMCD 100 is a multi-mode device that can facilitate voice and/or data communications using any one of LMR transceiver 202, cellular transceiver 216, or wireless interface 236. Communication sessions using any of these transceivers 202, 216, 236 can occur during different non-overlapping serial time intervals, or can occur in overlapping time intervals such that communication sessions using different transceivers are facilitated concurrently. As an example, consider that one or more mobile telephony sessions can begin and such session(s) can be implemented using cellular transceiver 216 (cellular telephony session) and/or wireless interface 236 (VoIP telephony session). Such telephony session will end, after which an LMR communication session can be initiated using LMR transceiver 202. After the LMR communication session ends, a new telephony session can begin. Conversely, the LMR communication session can occur concurrently during all or a portion of the time associated with the mobile telephony session. The various communications sessions can occur asynchronously so that it is not known in advance when one communication session will end and one will begin. Similarly, one or more LTE data sessions can be interspersed with one or more LMR sessions as described above. The LTE data session can be used to facilitate various functions such as video streaming, augmented reality, mapping, situational awareness and so on. In such a scenario, the LMR communication session can occur concurrently during all or a portion of the time associated with the LTE session.

Figure 3:
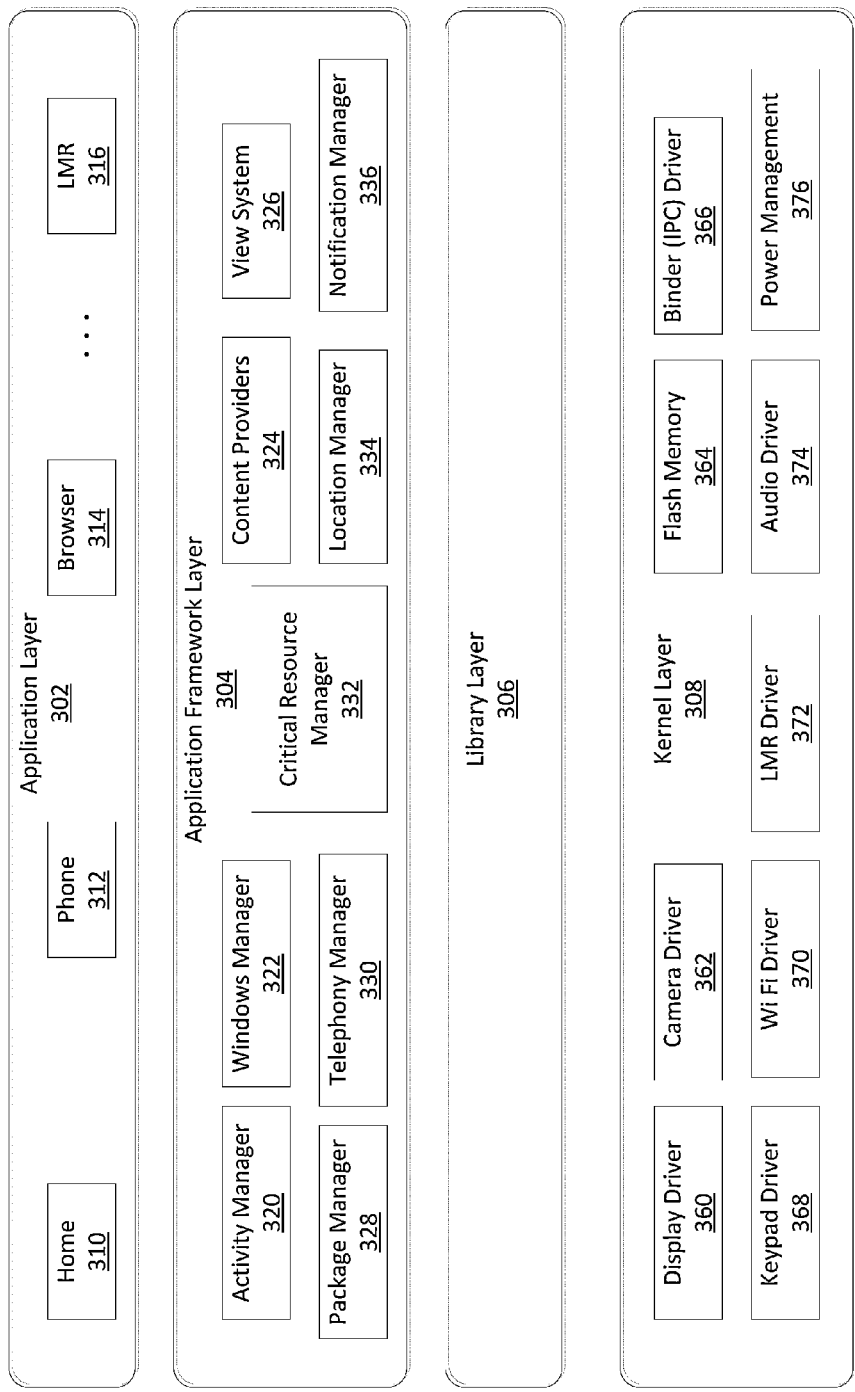
FIG. 3 is an operating system stack for an exemplary mobile operating system which shows a critical resource manager included in an application framework layer.

Referring now to FIG. 3, there is shown a block diagram that is useful for understanding an operating system stack for PMCD 100. Any suitable mobile device operating system can be used for the purposes of the present invention. The exemplary software stack shown in FIG. 3 is similar to the well known Android™ OS and can operate in a similar manner. Accordingly, the stack can include several layers including an application layer 302, application framework layer 304, library layer 306, and kernel layer 308. Each of these layers are well known in the context of the Android OS and in this exemplary embodiment will function in a similar manner relative to the layers in that operating system. Accordingly, the operation of each layer will not be described here in detail. However, a brief description is provided for purposes of facilitating an understanding the inventive arrangements.

The kernel layer 308 can be a Linux kernel which interacts with device hardware and includes software drivers appropriate for that purpose. For example, the kernel layer can include a display driver 360, camera driver 362, flash memory driver 364, binder (IPC) driver 366, keypad driver 368, WiFi driver 370, LMR driver 372 (for interfacing with LMR transceiver circuitry), audio driver 372, and power management driver 374. The kernel is essentially an abstraction layer and facilitates core functionality of the PMCD. Such functionality will include process management, networking operations, control of memory, security settings, and so on. Library layer 306 is comprised of a plurality of native libraries which facilitate processing of various types of data. This layer can also include virtual machine (e.g. the Dalvik Virtual machine) and core Java libraries as is known in the art. The various libraries are omitted in FIG. 3 to avoid obscuring the invention.

Application framework layer 304 contains various functional programs which interact directly or indirectly with software applications included in application layer 302. These computer programs include activity manager 320, windows manager 322, content providers 324, view system 326, package manager 328, telephony manager 330, location manager 334, and notification manager 336. The functions of these programs are well known to those familiar with operating systems such as Android OS and therefore will not be described here in detail. The application framework layer will also include a critical resource manager 332 which shall be described below in further detail. The critical resource manager (CRM) 332 is shown in FIG. 3 as residing exclusively within the application framework layer 304, but it should be appreciated that it can also include functional program elements which reside in the library layer 306 and within the kernel layer 308 without limitation. Application layer 302 is the top layer of the operating system stack and will include various application programs the user will interact with for controlling the operations of the PMCD 100. Application programs shown in the exemplary embodiment in FIG. 3 include home application 310, a phone application 312, a browser application 314 and an LMR application 316. Other application programs can include a camera application (video and/or still) without limitation. Of course, the invention is not limited to these particular application programs and more or fewer application programs can be provided.

Figure 4:
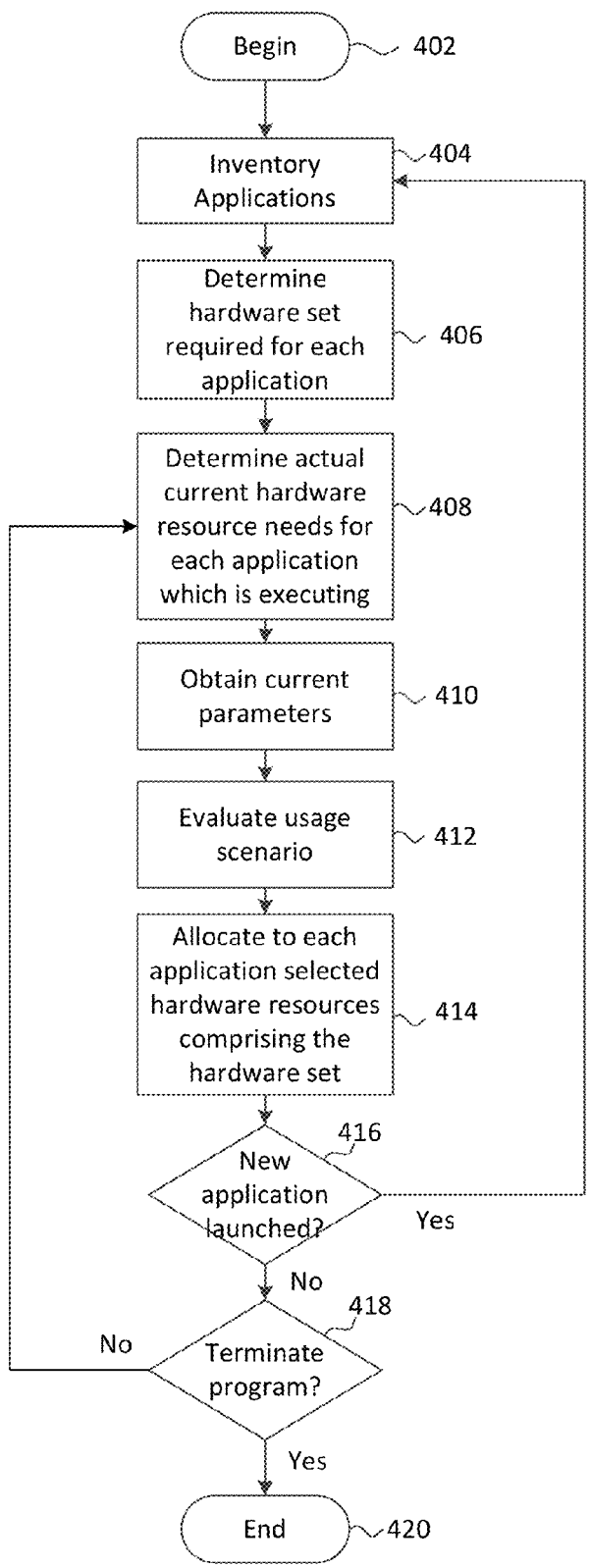
FIG. 4 is a flowchart that is useful for understanding the present invention.

Referring now to FIG. 4 there is shown a flowchart 400 that is useful for understanding the operations of CRM 332. The process begins at 402 and continues at 404 where an inventory is obtained with respect to software applications (e.g. software applications 310, 312, 314, and 316) presently executing on the PMCD 100. Thereafter, at 406, the CRM 332 determines a hardware set required for each software application. The hardware set will advantageously comprise a complete list of hardware elements which are needed by each software application to ensure full functionality of that application. For example, an exemplary application will generally require access to two or more hardware elements as shown and described with respect to FIG. 2. In some instances, shared access to a resource can be sufficient (i.e. access shared with another software application), but in other instances a software application may require exclusive access to a resource. Accordingly, the determination of the hardware set for each application can also include a determination as to whether the required access must be exclusive or whether shared access is sufficient.

At 408 a determination is made as to the current actual hardware resources required for a software application to function. As will be appreciated, certain hardware resources may not be required during all operating states of a software application. As an example, a touch screen display may be needed when dialing a telephone call, but may not be needed once the call is connected and while the telephony session is continuing. Accordingly, the touch-screen display would be part of the full hardware set required for a phone software application, but might not be part of the current hardware resources needed for an application to continue providing certain limited services.

The process continues on to 410 at which point a set of current values or status indicators is obtained with respect to various parameters. The parameters serve as input variables which are evaluated at 412 to determine a usage scenario for PMCD 100. The usage scenario can be thought of as an aggregate set of circumstances with respect to conditions internal and external to the PMCD 100. The parameters are used to dynamically determine which software applications will have priority access to the various hardware resources. Parameters can therefore include a wide range of variables which reflect conditions within PMCD 100 and/or conditions external to PMCD 100. The parameters are chosen so as to provide CRM 332 with sufficient information to identify the occurrence of certain mission critical conditions relevant to operation of PMCD 100. The parameters and usage scenario evaluation will be discussed below in greater detail.

As a result of the evaluation at 412, the CRM 332 will at 414 allocate to each application selected hardware resources. Ideally, each software application would always be allocated all hardware elements corresponding to its complete hardware set. In other words, it would be allocated all of the hardware elements in requires in order to carry out all of its functionality. However, hardware resources are necessarily limited on PMCD 100. Accordingly, a usage scenario is considered to ensure that mission critical functions of the PMCD 100 are not impeded. Accordingly, CRM will dynamically grant or deny each software application access to hardware resources based on the usage scenario (which varies over time), to ensure that mission critical functions are not impaired.

Following the allocation of hardware resources at 414, the process continues on to 416 where a determination is made as to whether a new application has been launched within the PMCD software environment. If so (416: Yes) then the process returns to 404 where a new inventory of applications is performed, followed by an update with regard to the hardware set information and current resource requirements of each application. The process then continues as described above with respect to steps 410-414. If no new application has been launched (416: No) then the process continues on to 418 where a determination is made as to whether the CRM program should be terminated. For example, if a determination is made that the PMCD 100 is being powered down, then it may be necessary to terminate the CRM program. If not (418: No) then the process returns to 408 to update the actual current hardware resource needs and parameters at 410. Thereafter, the process continues as previously described until the program is terminated at step 420.

Hardware resources can be allocated and de-allocated to particular software applications without terminating the software application or even notifying the particular software application that its access rights with respect to the particular hardware resource have been changed. Accordingly, the ability of a particular software application to access a particular hardware resource can be vary without communicating this information to the application. Instead, the CRM 332 handles requests or access to hardware resources and determines whether access should be granted based on the current usage scenario. For example, in a first usage scenario, a software application A may have access to a hardware resource such as a loudspeaker for playing audio. If CRM 332 determines (e.g., based on a change in the usage scenario) that software application A should lose access to the loudspeaker, then CRM 332 can terminate such access without notifying software application A. In such a scenario, software application A will continue to output audio data for playback, but CRM 332 will cause those audio samples to be discarded. Alternatively, CRM 332 can temporarily store those samples in a memory location for a time when software application A is once again granted access to the loudspeaker. CRM 332 can determine an appropriate response depending on a particular hardware resource and a particular usage scenario. Notably, software application A which has lost access to the hardware resource will continue to function as though it has access to the loudspeaker, but will not terminate. At such time as CRM 332 determines that software application A should again be granted access to the loudspeaker, it will advantageously provide such access in a way which is apparently seamless with respect to application A. These events involving allocation and de-allocation of hardware can be very short in duration (e.g., on the order of 3-5 seconds) or may be longer depending upon use case.

The CRM 332 exists as a software service which is configured to manage hardware resources comprising PMCD 100. Accordingly, CRM 332 has control over one or more application programming interfaces (APIs) contained in the library layer 306 through which software applications in application layer 302 can access hardware elements. It will be appreciated that software applications (e.g. 310, 312, 314, 316) do not directly possess rights to hardware elements available in PMCD 100. Instead, each software application must negotiate their required hardware resources through standard operating system APIs. The CRM 332 is advantageously configured to exist in consortium with these services and APIs to properly maintain expectations of all applications while providing dedicated or shared hardware resource access to priority applications. In some cases expected content or data from a hardware element will be replaced with false data by the CRM and will be communicated to non-priority applications so as to maintain application integrity. In other words, the CRM 332 will provide false data temporarily to a software application so that the execution of the application is not impaired while critical hardware resources are allocated to other, possibly higher priority software applications. Conversely, in some cases the CRM 332 may erase or discard data communicated to hardware resources so as to not interfere with use of those resources by priority software applications. Optionally, the CRM 332 may temporarily cause some or all of the data communicated from a software application to a particular hardware resource to be temporarily stored for later use.

As an example, suppose that application A is producing an audio stream as critical application B is also producing an audio stream. Further suppose that CRM 332 determines that application B should have dedicated access to the speaker. In such a scenario, CRM 332 will control the operation of the audio subsystem (e.g. codec 226) to mute audio from application A prior to any mixing of the two audio streams in the operating system/codec hardware mixer subsystem. Application A will continue to generate audio samples and push them into the stream unknowing that the audio samples are being discarded, stored or otherwise muted. Once the critical application B has completed its activity, the CRM will remove the mute on output stream from software application A. In such a scenario, the muted audio from application A may never be reproduced at the loudspeaker. However, in an alternative embodiment, CRM 332 can optionally cause any stored audio from application A to be played once the codec 226 (and/or other audio reproduction hardware) becomes available.

Figure 5:
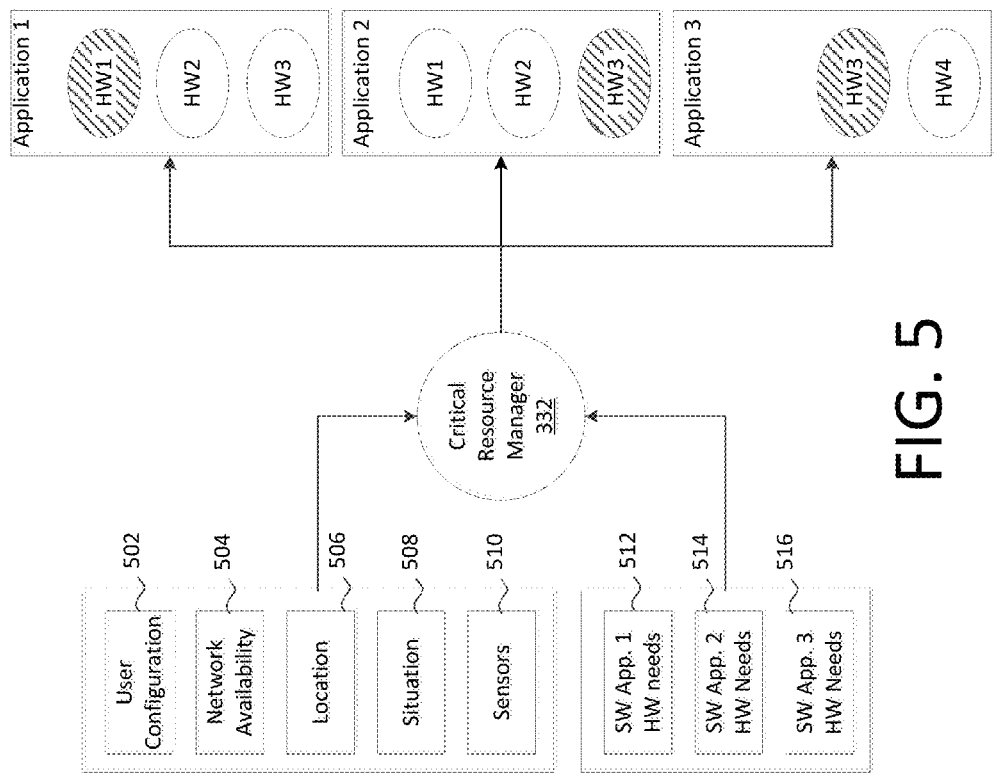
FIG. 5 is a conceptual block diagram that is useful for understanding a hardware resource allocation process.

Referring now to FIG. 5, there is provided a conceptual diagram that is useful for understanding the flowchart in FIG. 4. As shown therein, CRM 332 receives a plurality of parameters in various usage parameter categories 502, 504, 506, 508, 510. Categories of parameters can include user configuration information, network availability, device geographic location, and sensor data input. The sensor category can include information concerning conditions surrounding the PMCD 100, ambient conditions affecting the PMCD 100, and/or conditions affecting the user of PMCD 100. Accordingly, exemplary sensor data can provide information concerning motion, acceleration and vibration to which the PMCD is subjected, ambient sound detected by an audio transducer (microphone) provided as part of the PMCD, device orientation and so on. The parameters can also specify operability of various hardware components within the PMCD so that the CRM 332 is aware of hardware resource failures.

As also illustrated in FIG. 5, the CRM 332 obtains information from each software application regarding its current hardware resource needs. The hardware resource needs can include the complete hardware set required for full functionality of each application, and/or a listing of hardware resources which are needed for carrying out application functions based on a current state of the software application. Accordingly, hardware resource needs of a particular application can potentially vary over time. All of this information is evaluated in CRM 332 and is used to determine which applications require various hardware resources at different times. For example, the CRM 332 can use this information to ensure that mission critical functions provided by one or more software applications are not impeded by allocation of certain hardware resources to other software applications which are not currently deemed mission critical. Based on this evaluation, the CRM 332 will allocate available hardware resources to one or more software applications as shown.

For example, in the scenario shown, the hardware set for Application 1 includes HW1, HW2, and HW3. Recall that the hardware set is the total list of hardware resources which may be required by a software application for carrying out its various functions. CRM 332 has determined that HW1 is not mission critical to Application 1 in this usage scenario and therefore has determined that Application 1 will not have access to HW1. This determination can be based on an overall analysis of the usage scenario, or can be derived exclusively from information provided by Application 1. The lack of Application 1 access to HW1 is illustrated in FIG. 5 by the cross-hatching contained in HW1.

The hardware set for Application 2 also includes HW1, HW2, and HW3, but in the exemplary usage scenario, HW3 is needed by Application 1 for a mission critical function, and the CRM 332 has therefore not granted Application 2 access to HW3. Hardware resource HW1 is deemed to be mission critical to Application 2 in this usage scenario, and therefore HW1 is allocated exclusively to Application 2. Note that in this scenario, hardware resource HW2 is shared by both Application 1 and Application 2. The hardware set for Application 3 includes HW3 and HW4, but not HW1 or HW2. In this usage scenario, CRM 332 determines that HW3 is needed by Application 1 for a mission critical function. Accordingly, Application 3 is denied access to HW3. Application 3 is granted access to HW4 because that particular HW resource is not needed by either of the other applications. The most effective allocation of resources HW1, HW2, HW3, and HW4 among Applications 1, 2 and 3 can vary over time based on variations in the usage scenario. Accordingly, the CRM 332 will dynamically assign and re-assign hardware resources based on its current evaluation of the parameters and the overall usage scenario.

CRM 332 can use any suitable algorithm for purposes of ensuring that applications have access to necessary hardware resources to perform mission critical functions. In some embodiments, the algorithm can be a simple rule-based arrangement. However, the CRM 332 can also be configured to dynamically evaluate changing usage scenarios using a QoS calculator. The QoS calculator assigns different weights to different parameters for purposes of performing a hardware resource allocation. As an example, the CRM 332 could allocate available hardware resources to ensure that a certain quantitative QoS value representing a quality of service afforded to a particular software application is satisfied with respect to each software application. The QoS value can be predetermined based on the extent to which a particular software application is deemed to provide mission critical functions in each scenario. Alternatively, the QoS value could be dynamically varied in accordance with a particular usage scenario. Still, the foregoing arrangements are merely intended as examples and any suitable arrangement could be used for maintaining a suitable level of quality of service with respect to each software application.

Full-featured cell phone operating systems provide the most flexible software platform for purposes of integrating LMR, cellular telephone and broad-band data functions. Still mobile operating systems that are oriented towards cellular telephony operations commonly give hardware priority to phone applications. Such priority access is based on static rules and does not react to changes in circumstances or situations. In contrast, a system as described herein will augment a mobile operating system installed in a PMCD 100 to provide it with a dynamic capability for allocating hardware resources. Notably, the inventive arrangements facilitate a PMCD which uses a conventional off-the shelf operating system for a mobile device (e.g. a mobile operating system designed for a smart phone) which includes dynamic control of hardware access. This dynamic capability can ensure that user access to mission critical functionality (which varies over time and with different situations) is not impeded.

In order to better understand the inventive arrangements, some exemplary usage scenarios are provided below.

Example 1

A police officer initiates a cellular telephone call using a PMCD 100. The phone application 312 in PMCD 100 has exclusive access to certain hardware resources in the PMCD 100. The officer observes the occurrence of an auto accident while the telephone call is in progress and needs to call an LMR dispatch center for an ambulance. The officer presses a push-to-talk button to use the LMR radio function. An LMR radio call is a mission critical operation for the PMCD 100. CRM 332 detects the PTT button push as a usage parameter and responds by immediately re-assigning certain PMCD hardware resources from the phone application 312 to the LMR application 316. This interferes with or may even terminate the telephone call, but the LMR radio call is mission critical and takes priority.

Example 2

A police officer is using a broad-band wireless network and a browser application 314 to access certain image data concerning suspected criminal activity. The broadband data session in progress using browser application 314 requires certain hardware resources provided by PMCD 100. Suddenly, gunshots are fired and the sound of the gunshots is detected by sound sensors provided on PMCD 100. This information is communicated to CRM 332 as a usage parameter. The CRM 332 determines that a usage scenario has changed (gunshots are occurring) and recognizes that the officer may need to use an LMR radio function to call a dispatcher for assistance. The LMR radio call is mission critical and CRM 332 therefore immediately re-allocates hardware resources from browser application 314 to LMR radio application 316.

Example 3

Consider the same scenario as described in Example 2, except that instead of a sensing the occurrence of a gunshot, a motion or acceleration sensor detects that the officer is running while carrying the PMCD 100. CRM 332 receives this sensor information as a usage parameter and determines that a usage scenario has changed to a foot pursuit. Hardware resources in use by the browser application 314 are immediately re-allocated to the LMR application 316 to facilitate a call to dispatch.

Example 4

A police officer is carrying PMCD 100 while at a location outside of an LMR communication area. Not realizing that his location is outside of an LMR communication area, the police officer uses a PTT button to initiate an LMR radio transmission. CRM 332 detects the PTT button activation. CRM 332 also detects (using a location sensor such as a GPS device) that PMCD 100 has a location outside of the LMR communication coverage area or the LMR network is otherwise not available. The location information and PTT button press are parameters in this example. Based on this usage scenario, CRM 332 automatically allocates cellular transceiver hardware 216 to the LMR application 316 whereby the cellular transceiver hardware can be used to communicate through an available cellular telephone network to connect the PMCD 100 with an LMR dispatch station. Alternatively, rather than allocating cellular transceiver hardware 216 as described above, the CRM 332 could automatically allocate wireless transceiver interface 236 and/or other processing resources deemed necessary for a broadband wireless communication session. In such a scenario, a communication session could be based a wireless standard such as LTE, WiFi or any other suitable wireless protocol. Within this context, a PTT type VoIP session is contemplated and could be used for voice communication in the absence of the LMR network. Available hardware resources for the broadband wireless communication session could be automatically used to communicate with an LMR dispatch station when the LMR network was out of range.

Example 5

A first officer is using a PMCD as a cell phone. A second officer keys an emergency message to a dispatch station. The dispatch station sends an internet protocol (IP) based message to a plurality of PMCDs within a dispatch area, notifying them of the emergency. The first officer (using the PMCD as a cell phone) receives the IP emergency notification message as a stimulus parameter to CRM. As a result of receiving the notification, the hardware resources in the first officer's PMCD are exclusively allocated to LMR radio functions because LMR communication is deemed mission critical and has priority over cellular telephony function.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

We claim:

1. A method for providing to a plurality of software applications executing in a software environment controlled access to limited hardware resources on a Portable Multimode Communication Device ("PMCD"), comprising:

establishing a software environment in the PMCD in which a plurality of software applications are concurrently executing, each software application of the plurality of software applications configured to perform a predetermined application function using a respective hardware set, each respective hardware set including a plurality of hardware resources provided on said PMCD;

allocating the plurality of hardware resources to the plurality of software applications;

dynamically determining access priority levels for the plurality of software applications relative to at least a first hardware resource of the plurality of hardware resources at a present time by evaluating a usage scenario of the PMCD based on one or more parameters, where the access priority levels vary with changes in the usage scenario;

responsive to the evaluating, dynamically re-allocating the first hardware resource from a first software application of the plurality of software applications to a second software application of the plurality of software applications having a highest access priority level;

wherein the usage scenario comprises an aggregate set of circumstances, including events occurring within the PMCD and events occurring external to the PMCD, as indicated by the parameters; and wherein at least one of the parameters upon which the usage scenario is based is determined in accordance with an ambient condition selected from the group consisting of a visual scene, a presence of a particular identified human face a lighting condition an audio condition a Radio Frequency ("RF") communication operational status, a network operational status, an orientation condition, a location condition, and a motion condition.

2. The method according to claim 1, further comprising:
re-evaluating the usage scenario when a change has occurred in at least one of the parameters; and
selectively dynamically varying which of the plurality of hardware resources comprising each said hardware set are allocated to each said software application based on said change.

3. The method according to claim 1, further comprising selecting the parameters to include at least one parameter based on a user input to the PMCD.

4. The method according to claim 1, further comprising selecting the parameters to include at least one parameter based on a motion of said PMCD, said motion selected from the group consisting of a movement, vibration and acceleration.

5. The method according to claim 1, further comprising selecting the parameters to include at least one parameter based on a physical location of said PMCD.

6. The method according to claim 5, wherein said physical location is a geographic location determined by a location sensing system.

7. The method according to claim 1, further comprising selecting the parameters to include at least one parameter based on a physical orientation of said PMCD.

8. The method according to claim 1, further comprising selecting said plurality of software applications to include at least one software application implementing a Land Mobile Radio ("LMR") radio and at least one software application which implements a broadband wireless data communication session.

9. The method according to claim 1, wherein said software environment is an operating system for a mobile cellular telephone device, and said evaluating and said dynamically re-allocating are performed by a critical resource manager in accordance with a mission evaluation Quality of Service ("QoS") calculator.

10. A method for providing to a plurality of software applications concurrently executing in a software environment with controlled access to limited hardware resources on a Portable Multimode Communication Device ("PMCD"), comprising:

receiving data comprising a plurality of parameters;

determining a usage scenario for the PMCD based on the parameters, where the usage scenario comprises an aggregate set of circumstances including events internal and external of the PMCD;

dynamically determining access priority levels for the plurality of software applications relative to at least a first hardware resource of a plurality of hardware resources at a present time by evaluating said usage scenario, where the access priority levels vary with changes in the usage scenario; and dynamically re-allocating the first hardware resource from a first software application of the plurality of software applications to a second software application of the plurality of software applications having a relatively high access priority level, wherein the second software application is performing a function which is determined to be mission critical based on the usage;

wherein at least one of the parameters on which the usage scenario is based is determined in accordance with an ambient condition selected from the group consisting of a visual scene, a presence of a particular identified human face a lighting condition an audio condition a Radio Frequency ("RF") communication operational status, a network operational status, an orientation condition, a location condition, and a motion condition.

11. The method according to claim 10, further comprising selecting the parameters to include at least one based on a user input to the PMCD.

12. The method according to claim 11, wherein said user input is an activation of push-to-talk (PTT) button.

13. The method according to claim 10, further comprising:
performing with the first software application a Land Mobile Radio ("LMR") radio function; and
performing with the second software application at least one function selected from the group consisting of a broadband data communication function and a cellular voice telephony function.

14. A Portable Multimode Communication Device ("PMCD"), comprising:
a processing device concurrently executing a plurality of software applications in a software environment;
a plurality of hardware resources facilitating the function of said plurality of software applications;
wherein said processing device
receives data comprising a plurality of parameters;
determines a usage scenario for the PMCD based on the parameters, where the usage scenario is defined by an aggregate set of circumstances with respect to internal events and external events that are relevant to operation of the PMCD;
dynamically determines access priority levels for the plurality of software applications relative to at least a first hard resource of the plurality of hardware resources by evaluating said usage scenario, where at least one of the access priority levels varies with changes in the usage scenario; and
dynamically re-allocates the first hardware resource from a first software application of the plurality of software applications to a second software application of the plurality of second software applications having a relatively high access priority level, wherein the second software application performs a function which is determined to be mission critical based on the usage scenario;
wherein at least one of the parameters upon which the usage scenario is based is determined in accordance with an ambient condition selected from the group consisting of a visual scene, a presence of a particular identified human face, a lighting condition, an audio condition, a Radio Frequency ("RF") communication operational status, a network operational status, an orientation condition, a location condition, and a motion condition.

* * * * *